(12) United States Patent
Harrow et al.

(10) Patent No.: US 6,512,508 B2
(45) Date of Patent: *Jan. 28, 2003

(54) JOYSTICK INTERFACES AND METHODS OF PROVIDING POSITION INFORMATION OF A JOYSTICK

(75) Inventors: Scott E. Harrow, Scottsdale, AZ (US); Donald Kesner, Phoenix, AZ (US); Judy Fong, Chandler, AZ (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,690

(22) Filed: May 24, 1999

(65) Prior Publication Data

US 2001/0038379 A1 Nov. 8, 2001

(51) Int. Cl.[7] .................................................. G09G 5/08
(52) U.S. Cl. ........................ 345/161; 345/160; 345/163; 345/162; 345/167
(58) Field of Search ............................... 345/161, 162, 345/163, 167, 160, 159

(56) References Cited

U.S. PATENT DOCUMENTS

| 5,710,575 A | | 1/1998 | Hicok et al. | |
|---|---|---|---|---|
| 5,731,806 A | | 3/1998 | Harrow et al. | |
| 5,733,194 A | * | 3/1998 | Priem | 463/36 |
| 5,742,249 A | | 4/1998 | Hicok et al. | |
| 5,751,235 A | | 5/1998 | Hicok et al. | |
| 5,793,356 A | * | 8/1998 | Svancarek et al. | 345/161 |
| 6,017,273 A | * | 1/2000 | Pelkey | 463/36 |
| 6,078,311 A | * | 6/2000 | Pelkey | 345/161 |
| 6,189,401 B1 | * | 2/2001 | Atwell et al. | 74/471 |
| 6,233,511 B1 | * | 5/2001 | Berger et al. | 701/50 |

* cited by examiner

*Primary Examiner*—Richard Hjerpe
*Assistant Examiner*—Jean Lesperance
(74) *Attorney, Agent, or Firm*—Peter Zawilski (57) ABSTRACT

This invention provides joystick interfaces and methods of providing position information of a joystick. According to one aspect, the invention provides a joystick interface for use with a joystick, the joystick interface being configured to selectively operate in one of a digital mode and an analog mode, the joystick interface including an interconnect adapted to couple with a host system; a timing circuit adapted to couple with a joystick having a lever and configured to output a timing signal having a timing characteristic which is dependent upon the position of the joystick lever; and logic circuitry coupled with the interconnect and the timing circuit and configured to initiate a timing operation within the timing circuit to generate the timing signal and output an indication signal responsive to the timing signal during operation in an analog mode of operation, the logic circuitry being further configured to generate and output a digital value to the interconnect responsive to the timing signal and during operation in a digital mode.

43 Claims, 5 Drawing Sheets

JOYSTICK INTERFACES AND METHODS OF PROVIDING POSITION INFORMATION OF A JOYSTICK

TECHNICAL FIELD

This invention relates to joystick interfaces and methods of providing position information of a joystick.

BACKGROUND OF THE INVENTION

Joysticks have been utilized for many years in computer games and other applications. Some conventional joystick configurations include a plurality of potentiometers which individually set a time delay for a corresponding one-shot multivibrator. Movement of the position of the lever of a joystick changes the resistance of the potentiometer and also varies the time delay of the one-shot multivibrator. The measured time delay of the one-shot multivibrator is converted into a position by associated software executing within a host computer. In typical conventional configurations, two or more orthogonally arranged potentiometers are utilized per joystick to obtain related current axial settings of the joystick lever.

Conventional joysticks utilizing multivibrators have associated drawbacks. For example, the accuracy of the potentiometer output readout may be imprecise or inconsistent due to operational or structural imperfections of the multivibrators themselves. For example, readings may vary with changes in temperature and with inherent variations in individual components during manufacture.

Another significant drawback with utilization of conventional joystick arrangements is the demand imposed upon the operating software and hardware resources of the associated host system. An exemplary joystick is available from Microsoft Corporation having the designation Sidewinder Precision Pro. In typical configurations, the joystick operations consume a large amount of bus cycles for intense software loops which continuously poll the joystick system in order to determine the current axial position of the joystick. Such utilization of a large number of bus cycles consumes resources which would otherwise be available for other operations within the computer system providing enhanced system performance.

More recently, joystick configurations have been introduced which operate in a digital domain. Exemplary digital joystick configurations are described in U.S. Pat. Nos. 5,751,235, 5,742,249, 5,710,575 and 5,786,808, each of which is incorporated herein by reference. Some digital joystick configurations utilize analog-to-digital (A–D) converters which provide digital representations of voltages across potentiometers of the joystick. These configurations utilizing analog-to-digital converters have associated drawbacks which include inflexibility to new semiconductor processes and nonlinearities in joystick positioning, for example.

Therefore, a need exists to provide improved devices and methodologies for monitoring the position of a joystick.

BRIEF DESCRIPTION OF THE DRAWINGS

Preferred embodiments of the invention are described below with reference to the following accompanying drawings.

FIG. 3 is a graph illustrating a timing signal utilized to monitor positions of a lever of the joystick.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect, the invention provides a joystick interface for use with a joystick, the joystick interface being configured to selectively operate in one of a digital mode and an analog mode, the joystick interface comprising: an interconnect adapted to couple with a host system; a timing circuit adapted to couple with a joystick having a lever and configured to output a timing signal having a timing characteristic which is dependent upon the position of the joystick lever; and logic circuitry coupled with the interconnect and the timing circuit and configured to initiate a timing operation within the timing circuit to generate the timing signal and output an indication signal responsive to the timing signal during operation in an analog mode of operation, the logic circuitry being further configured to generate and output a digital value to the interconnect responsive to the timing signal and during operation in a digital mode.

A second aspect of the invention provides a joystick interface comprising: an interconnect adapted to couple with a host system; a timing circuit adapted to couple with a joystick having a lever, the timing circuit configured to output a timing signal having a timing characteristic which is dependent upon the position of the joystick lever; and logic circuitry coupled with the interconnect and the timing circuit, the logic circuitry being configured to receive the timing signal and generate and output a digital timing value to the interconnect responsive to the timing signal.

Another aspect provides a joystick interface for use with a joystick having a lever and a resistor which varies in resistance corresponding to the position of the lever, the joystick interface being configured to selectively operate in one of a digital mode and an analog mode, the joystick interface comprising: an interconnect adapted to couple with a host system and including a register; a timing circuit adapted to couple with a joystick and configured to output a timing signal having a timing characteristic which is dependent upon the resistance of a variable resistor of the joystick, and the timing circuit includes a capacitor; and logic circuitry coupled with the interconnect and the timing circuit, the logic circuitry being configured to selectively discharge the capacitor to initiate a timing operation within the timing circuit responsive to a control signal from the host system and to generate the timing signal and the timing characteristic corresponds to the charge time of the capacitor to a threshold, the logic circuitry being configured to output an indication signal responsive to the timing signal during operation in an analog mode of operation, the logic circuitry being further configured to periodically discharge the capacitor to initiate plural timing operations within the timing circuit to generate plural timing signals, and output plural digital timing values to the register of the interconnect and responsive to corresponding timing signals during operation in a digital mode, the host system being configured to access selected digital timing values from the register.

Another aspect provides a method of providing position information of a joystick comprising: providing a joystick interface adapted to couple with a joystick having a lever; selecting operation of the joystick interface in one of an analog mode and a digital mode; outputting an indication signal using the joystick interface responsive to operation in the analog mode; and outputting a digital value using the joystick interface responsive to operation in the digital mode.

According to another aspect, a method of providing position information of a joystick comprises: providing a joystick interface adapted to couple with a joystick having a lever; generating a timing signal using the joystick interface and having a timing characteristic dependent upon the position of the joystick lever; generating a digital timing signal responsive to the generating the timing signal; and outputting the digital timing signal.

Yet another aspect provides a method of providing position information of a joystick comprising: providing a control signal; generating a timing signal responsive to the control signal and the timing signal having a timing characteristic dependent upon the position of a joystick lever; resetting a counter responsive to the control signal; counting plural counter values using the counter following the resetting; and outputting a counter value responsive to the timing signal exceeding a threshold.

Figure 1:
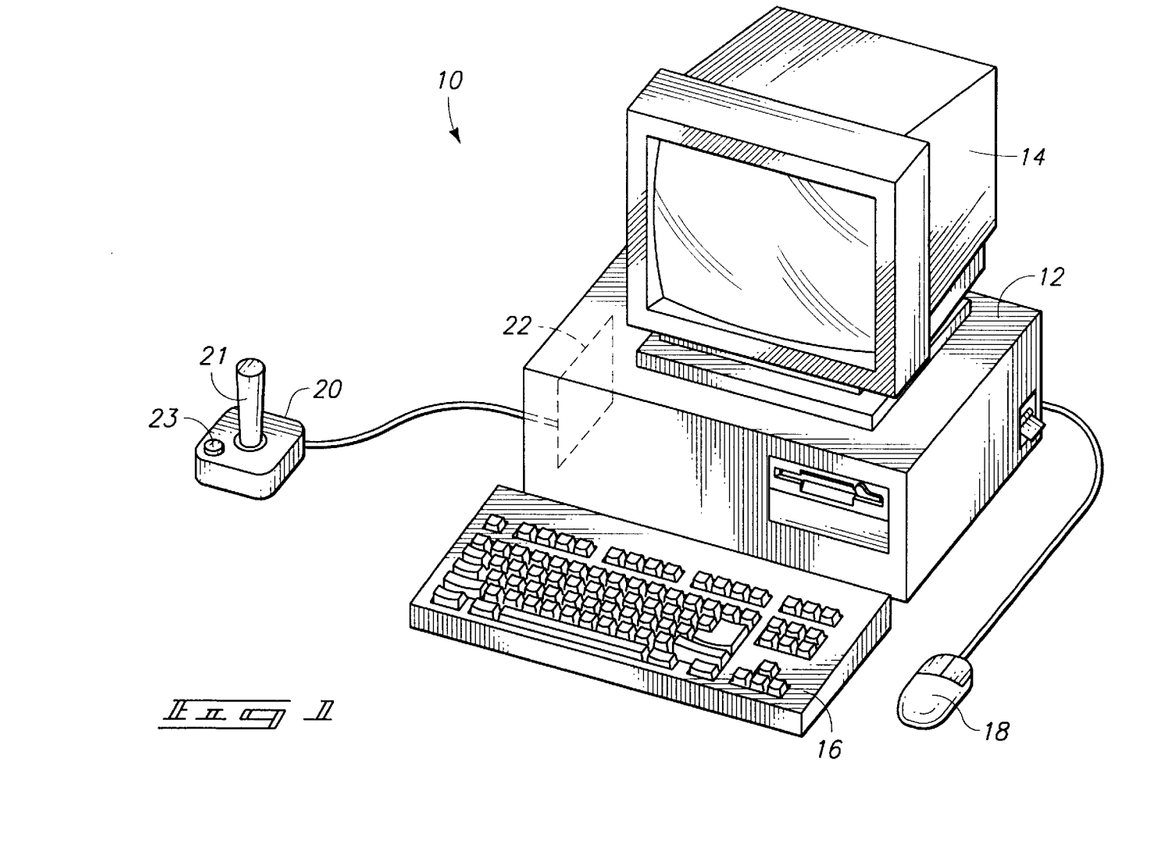
FIG. 1 is an isometric view of a host system and a joystick.

Referring to FIG. 1, an exemplary host system is illustrated as reference numeral 10. The depicted host system 10 is a personal computer. Another exemplary host system is a dedicated game control assembly configured to play selectable game cartridges. The present invention may be utilized with other host system configurations which utilize joysticks.

The depicted host system 10 includes a cabinet 12 configured to house components commonly utilized within personal computers, such as processing circuitry, memory circuitry and data storage devices (such internal components are not shown in FIG. 1). Cabinet 12 is coupled with a monitor 14 for displaying information to a user. Cabinet 12 is additionally coupled with a keyboard 16 and mouse 18 enabling a user to input data or otherwise control host system 10.

A joystick 20 is also coupled with host system 10 in the illustrated system configuration. As shown, joystick 20 includes a lever 21 and a button 23. The depicted configuration of joystick 20 is merely exemplary and other joystick configurations may be provided. Joystick 20 is configured to interface with host system 10 via a joystick interface 22. The depicted joystick interface 22 is implemented as an ISA board and includes circuitry configured to interface with joystick 20 as well as internal circuitry of host system 10. Other configurations of joystick interface 22 are possible.

In a preferred embodiment, joystick interface 22 is configured for use with either a digital joystick configuration or an analog joystick configuration. Host system 10 selectively configures joystick interface 22 in a digital mode or analog mode in a preferred embodiment. Such permits flexibility and enables operation with conventional joystick designs as well as modern joystick configurations.

Figure 2:
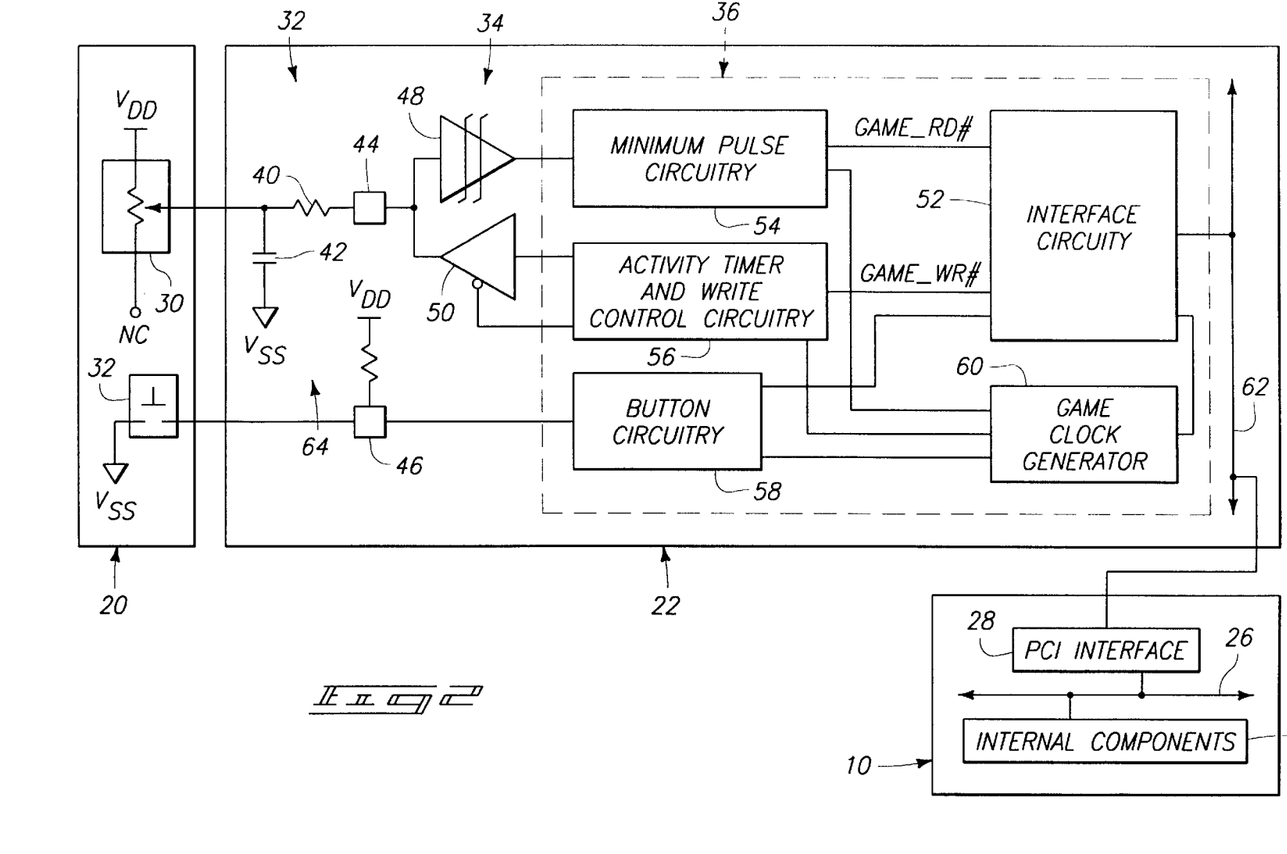
FIG. 2 is a functional block diagram of a joystick interface according to one exemplary aspect of the present invention.

Referring to FIG. 2, one embodiment of joystick interface 22 is illustrated. Joystick interface 22 is depicted intermediate an exemplary host system 10 and exemplary joystick 20. The illustrated host system 10 includes internal components 24 (e.g., processor, memory, etc.) coupled with a peripheral component interconnect (PCI) bus 26 and PCI interface 28. PCI interface 28 is coupled with joystick interface 22.

The depicted joystick 20 includes a variable resistor 30, also referred to as a potentiometer, and a button configuration 32. Variable resistor 30 is coupled with a $V_{DD}$ node as illustrated. Although only variable resistor 30 is depicted in FIG. 2, joystick 20 typically includes plural variable resistors to monitor plural directions of movement upon different axes of joystick 20. Accordingly, joystick interface 22 can include additional corresponding circuitry to interface with the additional potentiometer circuitry although such is not depicted in FIG. 2.

The illustrated joystick interface 22 includes board components 32, pad cells 34 and logic circuitry 36. Logic circuitry 36 is implemented as core logic hardware in the described embodiment. Components within logic circuitry 36 may be implemented in software in another embodiment and a dedicated micro-controller can be provided to implement the operations described herein.

Board components 32 include a resistor 40 and capacitor 42 in the depicted configuration. Resistor 40 and capacitor 42 are individually coupled with a sliding contact of variable resistor 30. The resistance intermediate the $V_{DD}$ node and the sliding contact varies corresponding to movement of joystick lever 21. Capacitor 42 is additionally coupled with a $V_{SS}$ node provided at a voltage potential less than the voltage potential of the $V_{DD}$ node.

Pad cells 34 include individual pads 44, 46. Pad 44 is coupled to receive timing signals from potentiometer 30 of joystick 20 as described below. Pad 44 is additionally coupled with a Schmitt trigger circuit 48 as well as a tri-state driver 50 provided in an open drain configuration. Pad 46 is coupled to receive signals from button 32 of joystick 20.

The depicted logic circuitry 36 includes interface circuitry 52, minimum pulse circuitry 54, activity timer and write control circuitry 56, button control circuitry 58 and a game clock generator 60. Minimum pulse circuitry 54 is coupled with and is configured to receive signals from Schmitt trigger circuit 48. Activity timer and write control circuitry 56 is coupled with and configured to control tri-state driver 50.

Minimum pulse circuitry 54 and activity timer and write control circuitry 56 are additionally coupled with interface circuitry 52. Interface circuitry 52 is coupled with an electrical interconnect 62 of joystick interface 22. Electrical interconnect 62 is an internal bus in an exemplary embodiment and is configured to couple with PCI interface 28 of host system 10. Interface circuitry 52 is adapted to communicate with host system 10 via electrical interconnect 62. Interface circuitry 52 includes analog circuitry configured to permit operation with conventional joystick arrangements. Interface circuitry 52 additionally includes digital circuitry configured to provide information regarding the position of joystick lever 22 during operation of joystick interface 22 in a digital mode.

Game clock generator 60 is coupled with an external timing reference such as a 14.3 MHz bus clock (not shown) in one embodiment. Game clock generator 60 supplies timing signals to interface circuitry 52, minimum pulse circuitry 54, activity timer and write control circuitry 56 and button circuitry 58. Button circuitry 58 is coupled with pad 46 and optionally includes debounce/deglitch circuitry to provide clean signals to interface 52.

Joystick interface 22 is configured to operate in one of the digital mode and analog mode responsive to control from host system 10. Operation in the analog mode is described first followed by a discussion of digital mode operation.

Board components 32 include a timing circuit 64 adapted to couple with joystick 20. Timing circuit 64 is utilized to perform a timing operation to provide position information of joystick lever 21 in the described embodiment. Timing circuit 64 is configured to output a timing signal to pad 44 having a timing characteristic which is dependent upon the position of joystick lever 21. More specifically, the timing characteristic is dependent upon the value of the variable resistor 30 corresponding to the position of joystick lever 21. The movement of joystick lever 21 varies the resistance of variable resistor 30.

Logic circuitry 36 is coupled with capacitor 42. As described in further detail below, logic circuitry 36 is configured to initiate the timing operation within timing circuit 64 to generate the timing signal responsive to a control signal from host system 10 during analog mode of operation and according to one aspect of the invention. Digital circuitry of interface circuitry 52 is not utilized during analog mode operations. During digital modes of operation, digital circuitry of interface circuitry 52 is configured to periodically initiate a timing operation within timing circuit 64 to generate periodic timing signals according to another aspect of the present invention.

Referring now to analog operations in detail, host system 10 outputs a control signal to request joystick position information. Responsive to the reception of the control signal from host system 10, joystick interface 22 is configured to provide an indication signal which may be utilized by host system 10 to determine the position of joystick lever 21.

More specifically, responsive to receiving a control signal from host system 10, interface circuitry 52 outputs a GAME_WR# to activity timer and write control circuitry 56. Activity timer and write control circuitry 56 output the GAME_WR# signal to initiate a timing operation within timing circuitry 64 to generate a timing signal and to provide position information.

The depicted timing circuit 64 includes capacitor 42. Logic circuitry 36 selectively discharges capacitor 42 to initiate the timing operation. In particular, the GAME_WR# signal outputted from activity timer and write control circuitry 56 controls tri-state driver 50 to discharge the voltage stored in capacitor 42. Initially, pad 44 is held at a high voltage potential (e.g., 3–5 Volts) and capacitor 42 charges to the voltage $V_{DD}$ less the voltage drop across variable resistor 30. Following the initiation of a timing operation, tri-state driver 50 holds pad 44 at a low voltage condition for a sufficient period of time to substantially discharge capacitor 42 responsive to the GAME_WR# signal from logic circuitry 36. Thereafter, pad 44 is returned to the high impedance condition to permit capacitor 42 to charge to the voltage potential of the $V_{DD}$ node less the voltage drop across variable resistor 30.

Charging of capacitor 42 following the discharging provides a timing signal having an increasing voltage at node 44 providing a timing characteristic. The timing characteristic corresponds to a charge time of the timing signal to a threshold voltage and is dependent upon the resistance of variable resistor 30 of joystick 20. The charge time of capacitor 42 varies responsive to the varying resistance of variable resistor 30 corresponding to the position of joystick 20.

Once pad 44 is charged to a pre-determined threshold voltage (e.g., 0.67 $V_{DD}$), Schmitt trigger 48 is configured to output a signal to minimum pulse circuitry 54. Minimum pulse circuitry 54 is thereafter configured to output a GAME_RD# signal to interface circuitry 52 responsive to receiving a rising edge signal from Schmitt trigger 48. In the analog mode of operation, interface 52 of logic circuitry 36 outputs an indication signal responsive to the timing signal reaching the threshold as determined by Schmitt trigger 48.

Host system 10 is configured to maintain an internal count following the outputting of the control signal to joystick interface 22 requesting position information in the analog mode of operation. Host system 10 thereafter operates to continually poll joystick interface 22 to determine whether the indication signal has been asserted. Following reception of the indication signal from interface circuitry 52 and electrical interconnect 62, host system 10 observes the internally counted value which corresponds to the assertion of the indication signal and thereafter determines the position of joystick lever 21. Thus, the position of joystick lever 21 is determined based upon the length of time intermediate the outputting of the control signal by host system 10 requesting position information and the assertion of the indication signal by interface circuitry 52.

Referring to FIG. 3, an exemplary timing operation corresponding to discharging and charging of capacitor 42 within timing circuit 64 is illustrated. Time increases from left to right in each of the individual waveforms. Waveform 70 corresponds to the deassertion of a control signal from host system 10 from time $t_0$ to time $t_1$ requesting position information of joystick 20. Waveform 72 represents the deassertion of the GAME_WR# signal from time $t_0$ to time $t_3$ as applied to tri-state driver 50 and responsive to the control signal from host system 10.

Waveform 74 represents the voltage at pad 44 during the timing operation. Waveform 76 represents the deassertion and assertion at time $t_0$ and time $t_6$, respectively, of the GAME_RD# signal outputted from minimum pulse circuitry 54 and applied to interface circuitry 52. Waveform 78 represents polling activities of software of host system 10 at time $t_2$, time $t_4$, time $t_5$, and time $t_7$.

Initially, host system 10 deasserts a control signal as indicated by waveform 70 at time $t_0$ and host system 10 begins an internal count procedure. Responsive to reception of the deasserted control signal, interface circuitry 52 deasserts a GAME_WR# signal applied to activity timer and write control circuitry 56 which operates tri-state driver 50 to drive pad 44 low. As illustrated in waveform 74, driving pad 44 low discharges capacitor 42.

The GAME_WR# is deasserted for a sufficient period of time to substantially discharge capacitor 42. In an exemplary embodiment, the GAME_WR# signal is deasserted for approximately 16 ms to completely discharge capacitor 42 using tri-state driver 50. As illustrated in waveform 76, the GAME_RD# signal outputted for minimum pulse circuitry 54 is also deasserted responsive to the deassertion of the GAME_WR# signal at time $t_0$.

At time $t_1$, the control signal from host system 10 is asserted. As illustrated by waveform 78, host system 10 polls joystick 22 at time $t_2$. The GAME_WR# signal is asserted at time $t_3$ which results in charging of capacitor 42 as illustrated by waveform 74. Host system 10 again polls joystick interface 22 at time $t_4$ and time $t_5$. However, inasmuch as the GAME_RD# has not been reasserted, host system 10 continues to internally count and poll joystick interface 22. At time $t_6$, the voltage at pad 44 reaches the threshold of Schmitt trigger 48 (e.g., 0.67 $V_{DD}$ in the described embodiment).

Thereafter, Schmitt trigger 48 supplies an output signal to minimum pulse circuitry 54. Minimum pulse circuitry 54 is configured to assert the GAME_RD# signal as depicted in waveform 76 for a sufficient period of time to enable host system 10 to read its level. Interface circuitry 52 is configured to output an indication signal corresponding to the GAME_RD# signal. As shown in waveform 78, host system 10 polls joystick interface 22 and receives the asserted indication signal at time $t_7$. Host system 10 observes its internal count value corresponding to time $t_7$. Host system 10 is next configured to convert the time duration of the deassertion of the GAME_RD# signal from time $t_0$ to time $t_7$ into a position of joystick lever 21. Such can comprise using an internal look-up table of host system 10.

Figure 4:
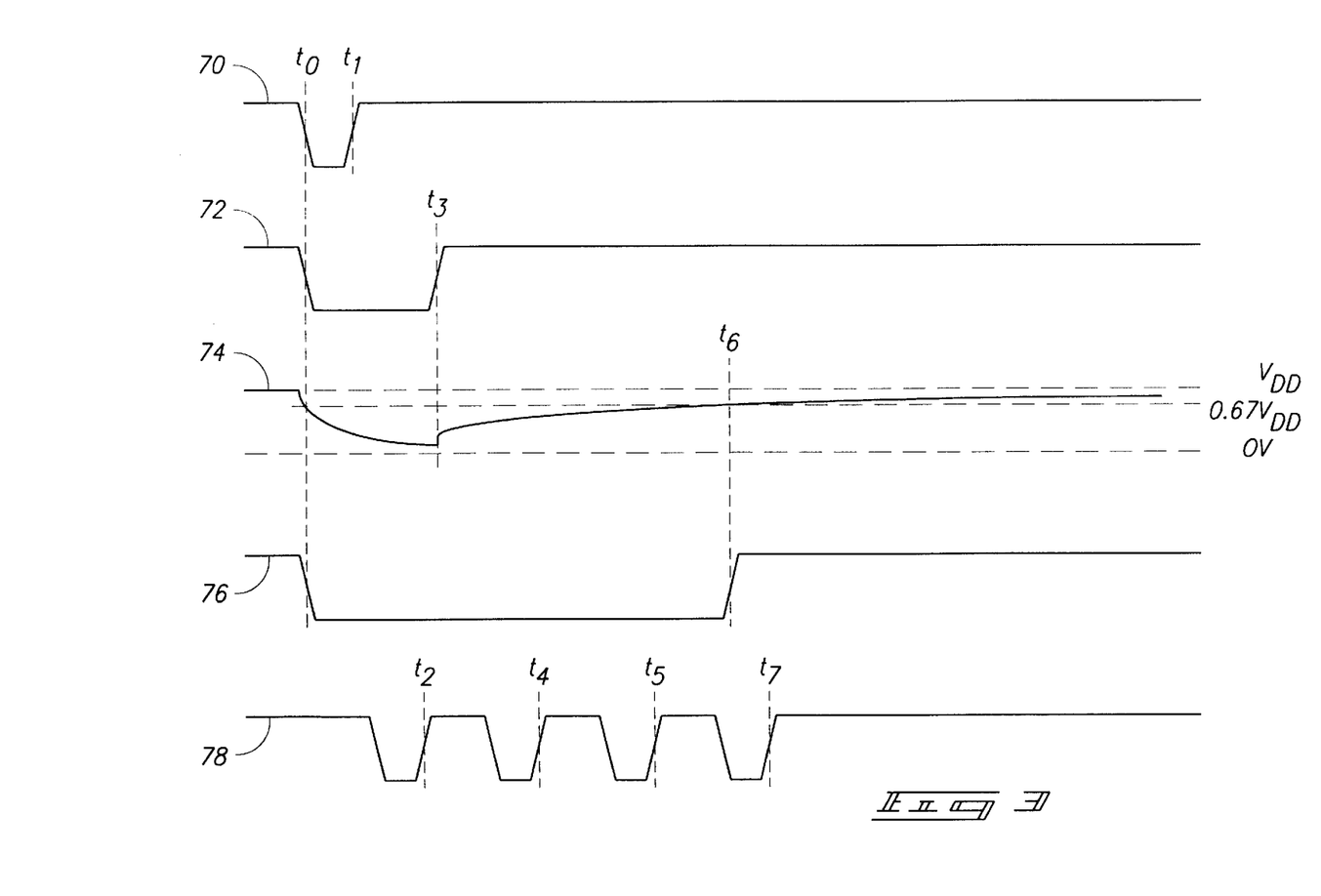
FIG. 4 is a functional block diagram of one exemplary configuration of interface circuitry of the joystick interface shown in FIG. 2.

Referring to FIG. 2 and FIG. 4, operations in a digital mode are next described. Interface circuitry 52 is configured to provide information corresponding to the position of joystick lever 21 in the digital mode. As shown in FIG. 4, interface circuitry 52 includes an internal discharge timer 80, counter 82 and register 84 arranged to implement digital mode operations. As previously described, host system 10 is configured to indicate to joystick interface 22 and interface circuitry 52 to operate in a digital mode.

Internal discharge timer 80 is coupled with circuitry 56 and counter 82. Counter 82 is additionally coupled with internal discharge timer 80 and register 84. In addition, counter 82 is configured to receive a digital resolution clock signal from game clock generator 60. Register 84 is coupled with minimum pulse circuitry 54 and electrical interconnect 62.

In a digital mode of operation, logic circuitry 36 is configured to generate and output digital values to electrical interconnect 62 responsive to timing signals corresponding to the discharging of capacitor 42. Interface 52 is configured to output digital values to interconnect 62 and host system 10 which correspond to positions of joystick lever 21. Such eliminates the polling operations of host system 10 as described with reference to the analog mode of operation. The digital values applied to interconnect 62 comprise digital timing values determined from counter 82 in the preferred embodiment.

Logic circuitry 36 is configured to periodically initiate timing operations within timing circuit 64 to generate timing signals during the preferred digital mode of operation. Logic circuitry 36 thereafter periodically outputs generated digital values to electrical interconnect 62.

Interval discharge timer 80 of interface circuitry 52 is configured to periodically generate a control signal to initiate the timing operation within timing circuit 64. The interval discharge timer 80 selectively deasserts the GAME_WR# applied to activity timer and write control circuitry 56 and tri-state driver 50 at a pre-determined period. In one configuration, the period is dependent upon the refresh rate of video monitor 14 of host system 10. In an exemplary embodiment, interval discharge timer 80 outputs the GAME_WR# signal every 6.5 ms.

Simultaneously with the outputting of the GAME_WR# signal, interval discharge timer 80 outputs a reset signal to counter 82. Counter 82 is configured to count a plurality of count values from zero following reception of the reset signal and at a rate determined by a digital resolution clock signal received from game clock generator 60. Once a subsequent reset signal is received, counter 82 resets to zero and begins counting again.

As previously described, the GAME_WR# signal initiates a timing operation within timing circuit 64 discharging capacitor 42. Once capacitor 42 is sufficiently charged following the discharge, Schmitt trigger 48 outputs a signal to minimum pulse circuitry 54 which applies the GAME_RD# signal to interface 52. In particular, the GAME_RD# signal is received within register 84. Responsive to the reception of the GAME_RD# signal, register 84 clocks in the current value of counter 82 providing a digital timing value. Register 84 stores the digital timing value for selective access by host system 10. Thus, interface circuitry 52 performs the counting operations eliminating the polling operations of analog configurations.

In sum, the digital timing value corresponds to the current count value of counter 82 following the generation of the timing value. Host system 10 can immediately access the digital timing value at any desired moment in time. Thereafter, host system 10 is configured to convert accessed digital timing values into corresponding positions.

The digital timing value is periodically updated within register 84 responsive to the periodic deassertion of the GAME_WR# signal. Such provides continually updated data regarding the position of joystick lever 21 for access by host system 10. Some of the digital timing values may not be accessed by host system 10. Such are discarded and replaced with updated digital timing values.

The preferred embodiment of joystick interface 22 is configured to monitor activity from host system 10 during analog modes of operation. In particular, activity timer and write control circuitry 56 is configured to monitor for the presence of a polling signal from host system 10. Such is beneficial inasmuch as permitting pad 44 to continually float results in unnecessary consumption of power during periods of inactivity.

During periods of inactivity, activity timer and write control circuitry 56 is configured to drive pad 44 to a high condition which drives the GAME_RD# signal high instead of in an unknown condition wherein power may be consumed. Activity timer and write control circuitry 56 is reset once a game read or write cycle is detected from host system 10. Activity timer and write control circuitry 56 is preferably active regardless of whether a joystick 20 is coupled with joystick interface 22 or not.

Figure 5:
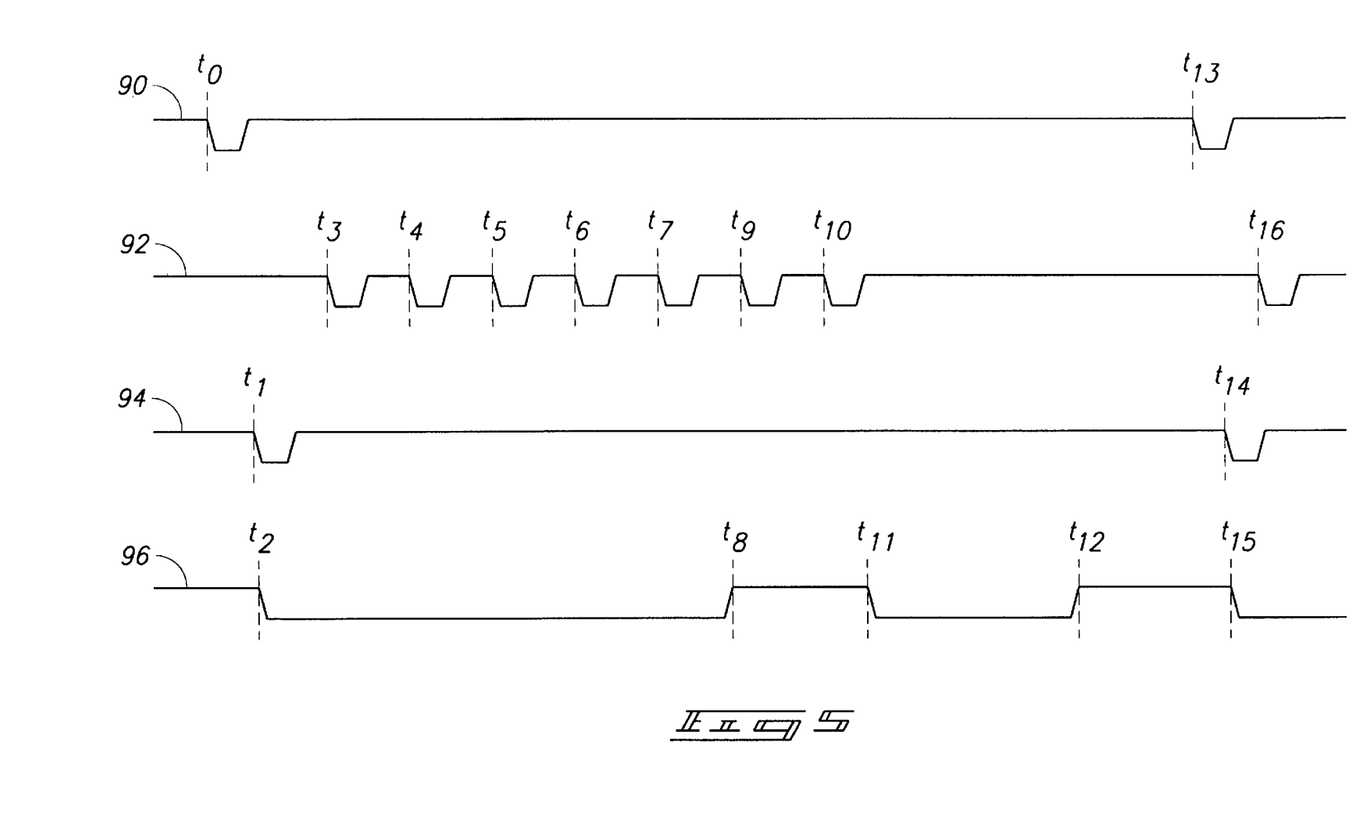
FIG. 5 is a graph illustrating an exemplary time-out activity timer operation according to one aspect of the invention.

Referring to FIG. 5, operations of activity timer and write control circuitry 56 are described with reference to various internal signals of joystick interface 22. Waveform 90 corresponds to a write cycle received within joystick interface 22 from host system 10. Waveform 92 corresponds to a read cycle received within joystick interface 22 from host system 10. Waveform 94 corresponds to the GAME_WR# signal and waveform 96 corresponds to the GAME_RD# signal. Time increases in the depicted waveforms from left to right.

The deassertion of the write signal from host system 10 at time $t_0$ as illustrated by waveform 90 results in a strobing of the GAME_WR# signal as illustrated by waveform 94. Such also results in deassertion of the GAME-RD# signal at $t_2$. Thereafter, a plurality of read cycles are conducted from time $t_3$–$t_{10}$ as shown by waveform 92. At time $t_8$, the GAME_RD# signal is asserted corresponding to the timing signal within timing circuit 64, reaching the threshold. The occurrence of this event is detected in the read cycle at time $t_9$.

Following a read cycle at time $t_{10}$, no read or write cycles are detected upon interconnect 62 from host system 10 until time $t_{13}$. As illustrated, activity timer and write control circuitry 56 enters a time-out condition at time $t_{12}$ to conserve power wherein pad 44 is driven high. If the time intermediate time $t_{11}$ and time $t_{13}$ exceeds a predefined time-out period (e.g., 100 ms), activity timer and write control circuitry 56 drives pad 44 high utilizing tri-state driver 50 (e.g., the event at time $t_{12}$ corresponds to the end of the time-out period). Such assures following time $t_{12}$ that the GAME_RD# signal high is represented by waveform 96 which reduces power consumption of joystick interface 22 during periods of inactivity.

Activity timer and write control circuitry 56 continues to monitor for the activity of another read or write cycle upon interconnect 62 following entry into the time-out mode or condition. For example, at time $t_{13}$, a write cycle is detected upon interconnect 62 as represented by waveform 90. Thereafter, interface circuitry 52 deasserts the GAME_WR# signal at time $t_{14}$ and activity timer and write control circuitry 56 outputs the GAME_WR# signal at time $t_{14}$. At time $t_{15}$, the GAME_RD# signal is deasserted and awaits the rising edge of the timing signal at node 44. Host system 10 polls the joystick interface 22 as represented by waveform 92 at time $t_{16}$. Thereafter, operation can continue as described with reference to FIG. 3.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A joystick interface for use with a joystick, the joystick interface being configured to selectively operate in one of a digital mode and an analog mode, the joystick interface comprising:
   a timing circuit adapted to couple with a joystick having a lever and configured to output a timing signal having a timing characteristic which is varies in length of time dependent upon the position of the joystick lever; and
   logic circuitry coupled with and the timing circuit and configured to output an indication signal to a host system responsive to the timing signal during operation in an analog mode of operation, the logic circuitry being further configured to output a digital value to a host system indicating the position of the joystick lever responsive to the length of time of the timing characteristic during operation in the digital mode.

2. The joystick interface according to claim 1 wherein the joystick includes a resistor which varies in resistance corresponding to the position of the joystick lever and the timing circuit comprises a capacitor coupled with the resistor and the timing characteristic corresponds to charging of the capacitor dependent upon the resistance of the resistor.

3. The joystick interface according to claim 2 wherein the logic circuitry is configured to selectively discharge the capacitor, and the timing characteristic further corresponds to a charge time of the capacitor to a threshold.

4. The joystick interface according to claim 1 wherein the logic circuitry is configured to periodically initiate a timing operation within the timing circuit to generate the timing signal during the digital mode of operation.

5. The joystick interface according to claim 1 wherein the logic circuitry is configured to initiate the timing operation within the timing circuit responsive to a control signal from the host system during the analog mode of operation.

6. The joystick interface according to claim 1 wherein the logic circuitry is configured to periodically output generated digital values.

7. The joystick interface according to claim 1 wherein the logic circuitry includes a register configured to store the digital timing value for selective access by the host system.

8. A joystick interface comprising:
   an interconnect adapted to couple with a host system;
   a timing circuit adapted to couple with a joystick having a lever, the timing circuit configured to output a timing signal dependent upon the position of the joystick lever; and
   logic circuitry coupled with the interconnect and the timing circuit, the logic circuitry being configured to count a plurality of values corresponding to the timing signal and to output a digital timing value corresponding to one of the values to the interconnect and to the host system responsive to the timing signal.

9. The joystick interface according to claim 8 wherein the joystick includes a resistor which varies in resistance corresponding to the position of the joystick lever and the timing circuit comprises a capacitor coupled with the resistor and configured to provide the timing signal.

10. The joystick interface according to claim 8 wherein the logic circuitry is configured to periodically initiate a timing operation within the timing circuit to generate the timing signal.

11. The joystick interface according to claim 8 wherein the logic circuitry is configured to periodically output generated digital timing values.

12. The joystick interface according to claim 8 wherein the digital timing value corresponds to the one value of the counter corresponding to the timing signal exceeding a threshold.

13. A joystick interface for use with a joystick having a lever and a resistor which varies in resistance corresponding to the position of the lever, the joystick interface being configured to selectively operate in one of a digital mode and an analog mode, the joystick interface comprising:
   an interconnect adapted to couple with a host system and including a register;
   a timing circuit adapted to couple with a joystick and configured to output a timing signal having a timing characteristic which is dependent upon the resistance of a variable resistor of the joystick, and the timing circuit includes a capacitor; and
   logic circuitry coupled with the interconnect and the timing circuit, the logic circuitry being configured to selectively discharge the capacitor to initiate a timing operation within the timing circuit responsive to a control signal from the host system and to generate the timing signal and the timing characteristic corresponds to the charge time of the capacitor to a threshold, the logic circuitry being configured to output an indication signal responsive to the timing signal during operation in an analog mode of operation, the logic circuitry being further configured to periodically discharge the capacitor to initiate plural timing operations within the timing circuit to generate plural timing signals, and output plural digital timing values to the register of the interconnect and responsive to corresponding timing signals during operation in a digital mode, the host system being configured to access selected digital timing values from the register.

14. A method of providing position information of a joystick comprising:
   operating a joystick interface in one of an analog mode and a digital mode;
   generating a timing signal having a timing characteristic which varies in length of time dependent upon a position of a joystick lever;

outputting an indication signal to a host system using the joystick interface responsive to the length of time of the timing characteristic and during operation in the analog mode; and outputting a digital value to a host system using the joystick interface responsive to the length of time of the timing characteristic and during operation in the digital mode.

15. The method according to claim 14 further comprising timing the timing characteristic and wherein the outputtings are responsive to the timing.

16. The method according to claim 15 further comprising generating a periodic control signal to initiate the generating the timing signal.

17. The method according to claim 15 further comprising periodically generating a control signal in the digital mode and the generating the timing signal being responsive to the generating the control signal.

18. The method according to claim 15 further comprising discharging and charging a capacitor and the generating the timing signal corresponds to the charging of the capacitor to a threshold.

19. The method according to claim 18 further comprising counting during the charging and the generating the digital signal being responsive to the counting.

20. The method according to claim 14 wherein the outputting the digital signal comprises periodically outputting the digital signal.

21. A method of providing position information of a joystick comprising:
   generating a timing signal dependent upon a position of a lever of a joystick;
   counting a plurality of values corresponding to the timing signal using a joystick interface;
   generating a digital timing signal corresponding to one of the values; and
   outputting the digital timing signal from the joystick interface to a host system.

22. The method according to claim 21 wherein the generating the timing signal and the generating digital timing signal individually comprise periodically generating.

23. The method according to claim 21 wherein the generating comprises generating using a timing circuit including a capacitor.

24. The method according to claim 23 further comprising periodically discharging and charging the capacitor and the generating the timing signal corresponds to the charging of the capacitor to a threshold.

25. The method according to claim 24 wherein the counting comprises counting during the charging and the generating the digital timing signal being responsive to the counting.

26. A method of providing position information of a joystick comprising:
   providing a control signal;
   generating a timing signal responsive to the control signal using a joystick interface and the timing signal having a timing characteristic dependent upon the position of a joystick lever;
   resetting a counter of the joystick interface responsive to the control signal;
   counting plural counter values using the counter following the resetting; and
   outputting a counter value from the joystick interface to a host system responsive to the timing signal exceeding a threshold.

27. The method according to claim 26 further comprising converting the outputted counter value into a joystick lever position.

28. The method according to claim 26 wherein the generating comprises:
   discharging a capacitor; and
   charging the capacitor.

29. The method according to claim 26 wherein the providing comprises periodically generating the control signal.

30. The method according to claim 26 wherein the outputting the counter value comprises periodically outputting plural counter values.

31. The method according to claim 26 further comprising storing the counter value.

32. The joystick interface according to claim 1 wherein the timing circuit comprises a capacitor and the timing characteristic corresponds to a length of time to charge the capacitor to a threshold.

33. The joystick interface according to claim 1 wherein the logic circuitry is configured to count a plurality of values and to select one of the values responsive to the timing characteristic, and wherein the digital value corresponds to the selected value.

34. The joystick interface according to claim 1 wherein the timing circuit comprises a capacitor and the timing characteristic corresponds to a length of time to charge the capacitor to a threshold, and wherein the logic circuitry is configured to count a plurality of values to time the timing characteristic and to select one of the values responsive to the charge of the capacitor reaching the threshold.

35. The joystick interface according to claim 1 wherein the timing circuit comprises a counter configured to time the length of time of the timing characteristic.

36. The joystick interface according to claim 8 wherein the timing signal has a timing characteristic which varies in length of time dependent upon the position of the joystick lever, and wherein the logic circuitry is configured to select the one value responsive to the length of time of the timing characteristic.

37. The joystick interface according to claim 8 wherein the timing circuit comprises a capacitor and the timing signal has a timing characteristic corresponding to a length of time to charge the capacitor to a threshold, and wherein the logic circuitry is configured to select the one value responsive to the charge of the capacitor reaching the threshold.

38. The method according to claim 14 further comprising charging a capacitor and wherein the generating comprises generating the timing signal having the timing characteristic corresponding to a length of time to charge the capacitor to a threshold.

39. The method according to claim 14 further comprising:
   counting a plurality of values; and
   selecting one of the values corresponding to the length of time of the timing characteristic, and the outputting the digital value comprises outputting responsive to the selecting.

40. The method according to claim 14 further comprising:
   charging a capacitor and wherein the generating comprises generating the timing signal having the timing characteristic corresponding to a length of time to charge the capacitor to a threshold;
   counting a plurality of values during the charging; and
   selecting one of the values corresponding to the length of time of the timing characteristic, and the outputting the digital value comprises outputting responsive to the selecting.

41. The method according to claim 21 wherein the generating comprises generating the timing signal having a timing characteristic which varies in the length of time dependent upon the position of the lever, and further comprising selecting the one value responsive to the length of time of the timing characteristic.

42. The method according to claim 21 further comprising charging a capacitor and wherein the generating comprises generating the timing signal having a timing characteristic corresponding to a length of time of charging the capacitor to a threshold, and further comprising selecting the one value responsive to the charge of the capacitor reaching the threshold.

43. The joystick interface according to claim 1 wherein the logic circuitry is configured to output the indication signal and the digital value to the host system comprising a personal computer.

\* \* \* \* \*